July 15, 1924.
J. L. BOISVERT
POULTRY HOUSE
Filed Aug. 18, 1922   2 Sheets-Sheet 1
1,501,742
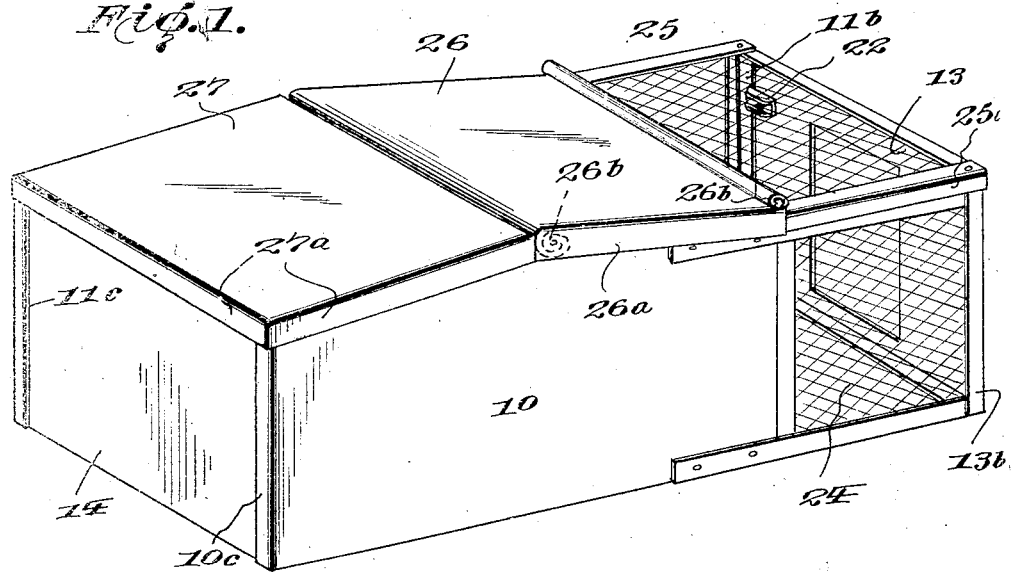
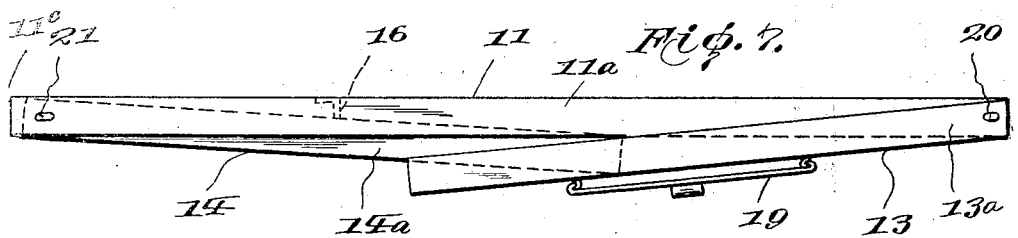
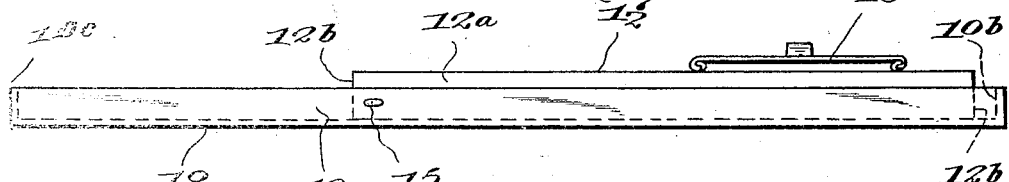
Inventor:
Joseph L. Boisvert.
By Milo B. Stevens & Co.
Attorney.

July 15, 1924.
J. L. BOISVERT
POULTRY HOUSE
Filed Aug. 18, 1922
1,501,742
2 Sheets-Sheet 2
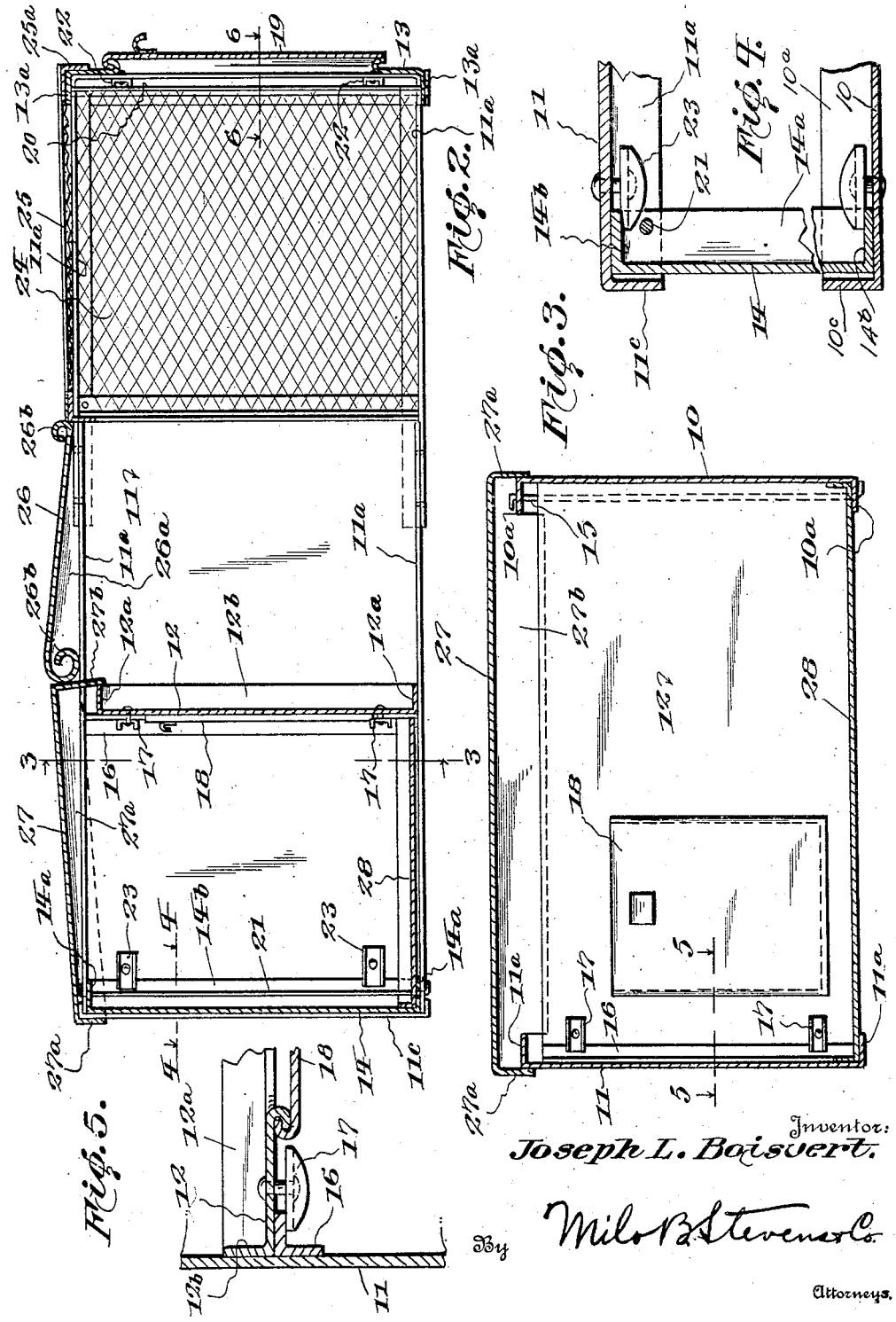
Inventor:
Joseph L. Boisvert,
By Milo B. Stevens & Co.
Attorneys.

Patented July 15, 1924.

1,501,742

UNITED STATES PATENT OFFICE.

JOSEPH L. BOISVERT, OF BOURBONNAIS, ILLINOIS.

POULTRY HOUSE.

Application filed August 18, 1922. Serial No. 582,721.

*To all whom it may concern:*

Be it known that I, JOSEPH L. BOISVERT, a citizen of the United States, residing at Bourbonnais, in the county of Kankakee and State of Illinois, have invented new and useful Improvements in Poultry Houses, of which the following is a specification.

This invention relates to structures for housing and confining poultry, and its object is to provide a structure of this kind embodying a certain novel and improved combination and arrangement of parts to be hereinafter described and claimed.

The invention also has for its object to provide a poultry house having collapsible and foldable walls to facilitate shipment and storage.

In order that the invention may be better understood, reference is had to the accompanying drawings, wherein:

Figure 1 is a perspective view of the structure; Fig. 2 is a central longitudinal section; Fig. 3 is a cross section on the line 3—3 of Fig. 2; Fig. 4 is a sectional detail on the line 4—4 of Fig. 2; Fig. 5 is a sectional detail on the line 5—5 of Fig. 3; Fig. 6 is a sectional detail on the line 6—6 of Fig. 2; Fig. 7 is a plan view showing one of the side walls, and certain parts associated therewith, folded, and Fig. 8 is a plan view of the other side wall and a partition carried thereby, showing said parts folded.

Referring specifically to the drawings, the poultry house has side walls 10 and 11, the former carrying intermediate its ends a partition 12 adapted to be extended across to the wall 11 to divide the enclosure into two compartments. The side wall 11 carries at its ends the front and rear end walls 13 and 14 of the enclosure. The partition is pivoted to the side wall 10, and the end walls 13 and 14 are pivoted to the side wall 11. When these walls are set up, the walls 13 and 14 extend between the side walls 10 and 11, and they are adapted to be detachably connected to the side walls 10, whereas the partition 12 extends between the walls 10 and 11 and is adapted to be detachably connected to the side wall 11. Upon disconnecting the walls 13 and 14 from the wall 10, and the partition 12 from the wall 11, the walls 13 and 14 may be folded over to lie alongside the wall 11, whereas the partition 12 may be folded to lie alongside the wall 10. Figs. 7 and 8 show the parts folded in this manner, and as their compass is now considerably reduced, shipment and storage will be greatly facilitated.

The wall 10 has inturned top and bottom flanges $10^a$, and the partition 12 has similar flanges $12^a$ and fits between the flanges $10^a$. A rod 15 passing through the flanges $10^a$ and $12^a$ pivotally connects the partition 12 to the wall 10. The partition also has outstanding end flanges $12^b$.

The partition 12 closes up against an angle jamb strip 16 secured to the inner face of the wall 11, and it carries turn-buttons 17, which latter are adapted to be swung to engage the jamb strip, whereby the detachable connection between the partition and the wall 11 is had.

The partition 12 is provided with a doorway so that the occupants of the enclosure may pass from one compartment to the other. A vertically slidable door 18 is provided in order that the doorway may be closed if it is desired to confine the chicks in the compartment defined by the partition 12, the side walls 10 and 11, and the rear wall 14. The front wall 13 also has a doorway provided with a sliding door 19 which may be opened to permit the occupants of the enclosure to leave the same.

The side wall 11 has inturned top and bottom flanges $11^a$ and the end wall 13 has similar flanges $13^a$ which fit over the flanges $11^a$ and $10^a$. A rod 20 passing through the flanges $11^a$ and $13^a$ provides a pivotal connection between the side wall 11 and the front end wall 13. A similar rod 21 passing through inturned top and bottom flanges $14^a$ of the rear end wall 14 and the flanges $11^a$ provides the pivotal connection between said wall 14 and the side wall 11.

The detachable connection between the wall 13 and the wall 11 is made by turn-buttons 22 carried by the former and engageable with inturned vertical flange $11^b$ at the forward ends of the wall 11. A similar connection is made between the rear end wall 14 and the side wall 11, the turn-buttons being shown at 23. However, the wall 14 has inturned end flanges $14^b$ which are engageable by these turn-buttons, and this wall seats between the top and bottom flanges $10^a$ and $11^a$ of the side walls 10 and 11. At their rear ends, the walls 10 and 11 have inturned flanges $10^c$ and $11^c$ which lap the end wall 14. The ends of the wall 13 have inturned flanges $13^b$ which lap the side walls 10 and 11.

The forward ends of the side walls 10 and 11 are made reticulate by a wire netting, as shown at 24.

The enclosure is also provided with a roof composed of three sections 25, 26 and 27. The section 25 is composed of a frame carrying a wire netting and it covers the front end of the enclosure. The section 26 covers the intermediate portion of the enclosure, and the section 27 covers the rear end of the enclosure. The roof sections are all removably mounted on the enclosure so that the latter may be folded as hereinbefore described. The section 25 has depending side and front end flanges $25^a$ to lap the walls 10, 11 and 13, at the top thereof. The section 26 has depending side flanges $26^a$ to lap the walls 10 and 11, at the top thereof. The section 27 has depending side and rear end flanges $27^a$ to lap the walls 10, 11 and 14, at the top thereof. The section 27 also has a depending front flange $27^b$ which extends down to and fits against the top flange $12^a$ of the partition 12. It will be noted that the roof sections 26 and 27 are made sloping so that they may shed rain. At its front and rear ends, the section 26 has rolled edges $26^b$ to strengthen said section and to prevent water from getting into the rear compartment defined by the walls 14, 10 and 11, and the partition 12.

The rear compartment just described is provided with a removable floor consisting of a sheet metal plate 28 which seats on the bottom flanges $10^a$, $11^a$ and $14^a$. The front compartment, which serves as a runway, is not provided with a floor. The floor 28 serves to prevent rats and other animals from getting into the rear compartment by burrowing up through the ground.

The front compartment defined by the walls 10, 11 and 13, and the partition 12 has its forward portion made reticulate by the side wire netting 24 and the roof section 25, this being done for the purpose of obtaining light and ventilation. The rear portion of this compartment is closed in at the sides by the imperforate walls 10 and 11 and the roof section 26, so that the chicks may obtain shelter without entering the rear compartment.

I claim:

1. A collapsible poultry house comprising side walls having upper and lower inwardly directed longitudinal flanges, end walls having horizontal flanges swingingly connected to the upper and lower flanges of one of said side walls and having vertical flanges joined with said horizontal flanges, a partition having upper and lower flanges swingingly connected to the upper and lower flanges of the side wall opposite the side wall having the flanges to which the end walls are connected, and a top having flanges extending over the side walls and having an end flange over and engaging the upper flange of said partition.

2. A collapsible poultry house comprising side walls having upper and lower inwardly directed longitudinal flanges, end walls having horizontal flanges swingingly connected to the upper and lower flanges of one of said side walls and having vertical flanges joined with said horizontal flanges, a partition having upper and lower flanges swingingly connected to the upper and lower flanges of the side wall opposite the side wall having the flanges to which the end walls are connected, a top having flanges extending over the side walls and having an end flange over and engaging the upper flange of said partition, and a bottom mounted on the lower longitudinal flanges of said side walls.

In testimony where I affix my signature.

JOSEPH L. BOISVERT.